US012749164B2

(12) United States Patent
Reusen et al.

(10) Patent No.: US 12,749,164 B2
(45) Date of Patent: Sep. 29, 2026

(54) METHOD OF GENERATING A DE-INTERLACING FILTER AND IMAGE PROCESSING APPARATUS

(71) Applicant: Melexis Technologies NV, Tessenderlo (BE)

(72) Inventors: Wouter Reusen, Tessenderlo (BE); Luc Buydens, Tessenderlo (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 682 days.

(21) Appl. No.: 17/984,387

(22) Filed: Nov. 10, 2022

(65) Prior Publication Data

US 2023/0177656 A1 Jun. 8, 2023

(30) Foreign Application Priority Data

Dec. 3, 2021 (EP) .................................... 21212245

(51) Int. Cl.

*G06T 5/73* (2024.01)
*G06T 5/20* (2006.01)
*G06T 7/168* (2017.01)

(52) U.S. Cl.

CPC .................. *G06T 5/73* (2024.01); *G06T 5/20* (2013.01); *G06T 7/168* (2017.01);
(Continued)

(58) Field of Classification Search

CPC .. G06T 5/73; G06T 5/20; G06T 7/168; G06T 2207/10048; G06T 2207/20021;
(Continued)

(56) References Cited

U.S. PATENT DOCUMENTS 6,055,018 A 4/2000 Swan
10,473,429 B1 * 11/2019 Louchard ............... G06V 10/48
(Continued)

OTHER PUBLICATIONS

A robust fuzzy-bilateral filtering method and its application to video deinterlacing (Year: 2013).*

*Primary Examiner* — Ming Y Hon
*Assistant Examiner* — Amanda H Pearson
(74) *Attorney, Agent, or Firm* — Harness, Dickey & Pierce, P.L.C.

(57) ABSTRACT

A method of generating a de-interlacing filter comprises: analysing a pixel array comprising an interlacing pattern of pixels. The interlacing pattern of pixels comprises first and second pluralities of pixels configured to be read during a first measurement subframe and a second measurement subframe, respectively. An n-state representation of the interlacing pattern of pixels is generated and distinguishes between the first plurality of pixels and the second plurality of pixels. The n-state representation of the interlacing pattern is translated to a spatial frequency domain, thereby generating a spatial frequency domain representation of the n-state representation of the interlacing pattern. A DC signal component is then removed from the spatial frequency domain representation of the n-state representation of the interlacing pattern, thereby generating a DC-less spatial frequency domain representation. A kernel filter is then selected and configured to blur before convolving the DC-less spatial frequency representation with the selected kernel filter.

15 Claims, 11 Drawing Sheets

(52) U.S. Cl.
CPC ............... *G06T 2207/10048* (2013.01); *G06T 2207/20021* (2013.01); *G06T 2207/20056* (2013.01); *G06T 2207/20201* (2013.01)

(58) Field of Classification Search
CPC . G06T 2207/20056; G06T 2207/20201; G06T 5/70; G06T 5/10; H04N 23/23; H04N 25/40; H04N 23/683; H04N 23/81
See application file for complete search history.

(56) References Cited

U.S. PATENT DOCUMENTS

| | | | | |
|---|---|---|---|---|
| 2004/0056978 | A1* | 3/2004 | Thompson ............. | H04N 5/775<br>348/448 |
| 2010/0149415 | A1* | 6/2010 | Znamenskiy .......... | H04N 7/012<br>348/448 |
| 2010/0238355 | A1 | 9/2010 | Blume | |

* cited by examiner

METHOD OF GENERATING A DE-INTERLACING FILTER AND IMAGE PROCESSING APPARATUS

CROSS-REFERENCE TO RELATED APPLICATION(S)

The present application claims priority under 35 U.S.C. § 119 to European Patent Application No. 21212245.1, filed Dec. 3, 2021, the entire contents of which are incorporated herein by reference.

FIELD

The present invention relates to method of generating a de-interlacing filter, the method being of the type that, for example, is applied to an image to remove motion artefacts. The present invention also relates to an image processing apparatus of the type that, for example, processes an image to remove motion artefacts.

BACKGROUND

Video interlacing is a known technique to reduce transmission bandwidth requirements for frames of video content. Typically, a video frame is divided into multiple subframes, for example two subframes. Each subframe occurs consecutively in a repeating alternating pattern, for example: subframe 1-subframe 2-subframe 1-subframe 2, - . . . . The effect of dividing the video frame is, for example, to halve the bandwidth required to transmit the video frame and hence video content.

It is known to apply this technique in the field of image sensors where a multiplexed readout circuit can be employed, the multiplexed readout circuit serving multiple pixels. Sensors that comprise a readout circuit shared by multiple pixels benefit from a reduced size owing to the ability to read multiple pixels using the same reduced capacity, and hence sized, readout circuit. Additionally, such smaller-sized readout circuits benefit from a lower power consumption rating as compared with a full size (and capacity) readout circuit. In the case of sensors for temperature imaging systems, the reduced power consumption translates to reduced self-heating of thermal sensor pixels and thus decreased measurement inaccuracies.

For example, the MLX90640 far infra-red thermal sensor array available from Melexis Technologies NV supports two subframes, because the readout circuit of the sensor array is shared between two sets of detector cells. In operation, measurements in respect of a first set of detector cells are made during a first subframe and then measurements in respect of a second set of detector cells are made during a second subsequent subframe following immediately after the first subframe. Hence, a full measurement frame of the sensor array is updated at a speed of half the refresh rate. A default arrangement for reading the detector cells of the sensor array is a chequerboard pattern, whereby detector cells of a first logical “colour” are read during the first subframe and detector cells of a second logical “colour” are read during the second subframe.

This manner of reading the detector cells is known as interlaced scanning and is susceptible to so-called motion artifacts, also known as interlacing effects. The motion artifacts appear when an object being captured in the field of view of the sensor array moves sufficiently fast so as to be in different spatial positions during each subframe when the respective sets of detector cells are being read, i.e. the moving object is imaged onto a different sets of detector cells between subframes.

SUMMARY

According to a first aspect of the present invention, there is provided a method of generating a de-interlacing filter, the method comprising: analysing a pixel array comprising an interlacing pattern of pixels, the interlacing pattern of pixels comprising a first plurality of pixels and a second plurality of pixels configured to be read during a first measurement subframe and a second measurement subframe of a plurality of measurement subframes, respectively; generating an n-state representation of the interlacing pattern of pixels distinguishing between the first plurality of pixels and the second plurality of pixels, where n is the number of measurement subframes; translating the n-state representation of the interlacing pattern to a spatial frequency domain, thereby generating a spatial frequency domain representation of the n-state representation of the interlacing pattern; removing a DC signal component from the spatial frequency domain representation of the n-state representation of the interlacing pattern, thereby generating a DC-less spatial frequency domain representation; selecting a kernel filter configured to blur; and convolving the DC-less spatial frequency representation with the selected kernel filter.

The first and second measurement subframes may relate to different time intervals within a measurement time frame. The first and second measurement subframes may be consecutive. The first and second measurement subframes may be non-overlapping.

The kernel filter may be a Gaussian blur filter or a box blur filter.

The interlacing pattern may be a chequerboard pattern.

The interlacing pattern may be an interleaved pattern.

The interleaved pattern may comprise a series of alternating horizontal lines of pixels.

The interlacing pattern of pixels may comprise a third plurality of pixels to be read in respect of a third measurement subframe; the n-state representation of the interlacing pattern of pixels may distinguish between the first plurality of pixels, the second plurality of pixels, and the third plurality of pixels.

Translating the n-state representation of the interlacing pattern to the spatial frequency domain may comprise: calculating a two-dimensional Fourier transform in respect of the n-state representation of the interlacing pattern.

Generating the n-state representation of the interlacing pattern of pixels may comprise: generating a measurement subframe map of the pixel array; the measurement subframe map may be an array representing each pixel of the pixel array; and for each element of the measurement subframe map, recording the measurement subframe assigned to the corresponding pixel of the pixel array.

The plurality of measurement subframes may be two measurement subframes.

The plurality of measurement subframes may be three measurement subframes.

According to a second aspect of the invention, there is provided a method of de-interlacing an image, the method comprising: capturing an image; translating the image to the spatial frequency domain; generating a de-interlacing filter as set forth above in relation to the first aspect of the present invention; and applying the de-interlacing filter to the spatial frequency domain representation of the image captured.

The de-interlacing filter may be applied by multiplying the de-interlacing filter with the frequency domain representation of the image captured, thereby generating a de-interlaced image in the spatial frequency domain.

The method may further comprise: translating the de-interlaced image in the spatial frequency domain to the spatial domain.

The image captured may be a thermal image.

According to a third aspect of the invention, there is provided an image processing apparatus comprising: a pixel array configured to receive electromagnetic radiation and measure electrical signals generated by each pixel of the pixel array in response to receipt of the electromagnetic radiation, the pixel array comprising an interlacing pattern of pixels, the interlacing pattern of pixels comprising a first plurality of pixels and a second plurality of pixels configured to be read during a first measurement subframe and a second measurement subframe of a plurality of measurement subframes, respectively; and a signal processing circuit configured to analyse the pixel array and to generate an n-state representation of the interlacing pattern of pixels distinguishing between the first plurality of pixels and the second plurality of pixels, where n is the number of measurement subframes; wherein the signal processing circuit is configured to translate the n-state representation of the interlacing pattern to a spatial frequency domain, thereby generating a spatial frequency domain representation of the n-state representation of the interlacing pattern; the signal processing circuit is configured to remove a DC signal component from the spatial frequency domain representation of the n-state representation of the interlacing pattern, thereby generating a DC-less spatial frequency domain representation; the signal processing circuit is configured to select a kernel filter configured to blur; and the signal processing circuit is configured to convolve the DC-less spatial frequency representation with the selected kernel filter.

It is thus possible to provide a method of generating a de-interlacing filter and an image processing apparatus that provides improved removal of motion artefacts from images captured by an imaging system, for example a thermal imaging system. The system is also relatively simple to implement and thus minimises the processing overhead required to generate the de-interlacing filter.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
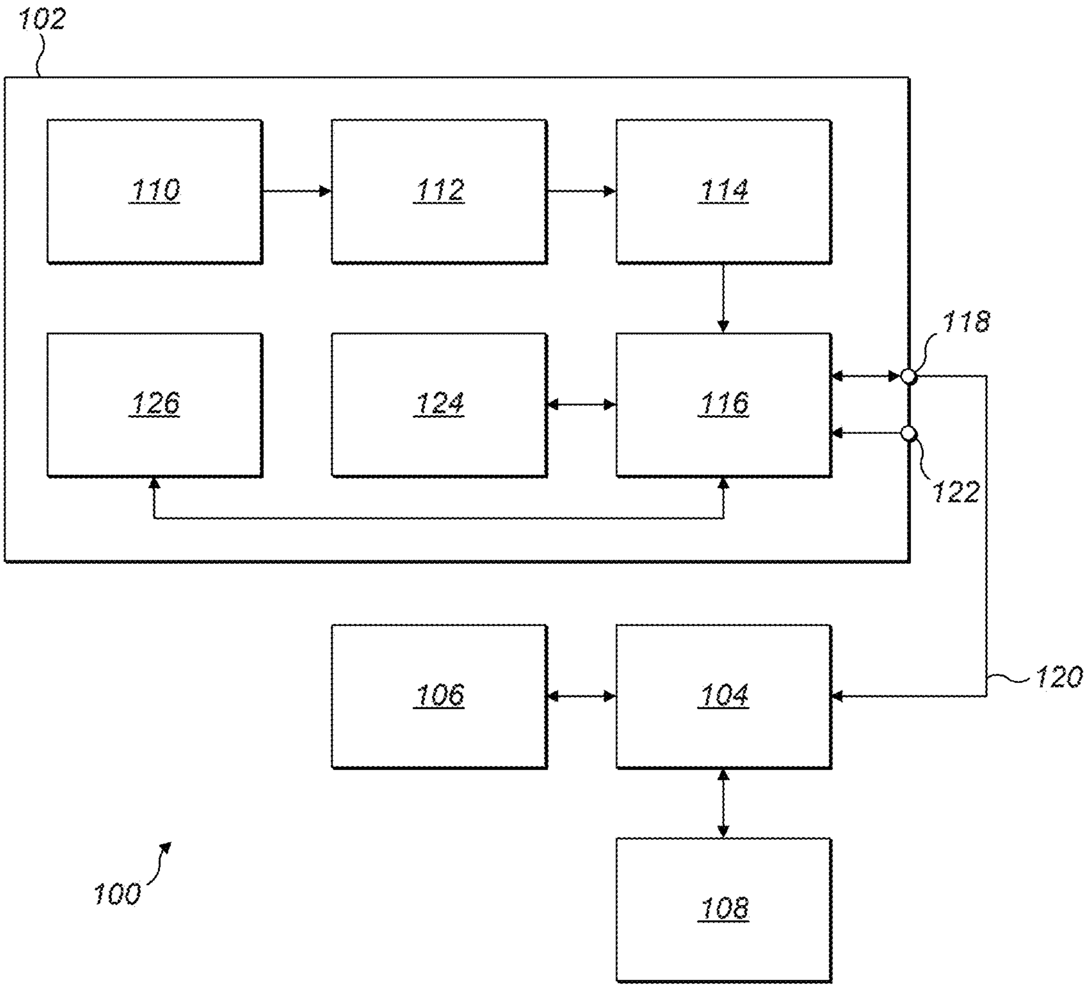
FIG. 1 is a schematic diagram of a temperature imaging system constituting an embodiment of the invention.

Throughout the following description, identical reference numerals will be used to identify like parts.

Referring to FIG. 1, an imaging system, for example a temperature imaging system 100, comprises a far infra-red thermal sensor array 102, for example an MLX90640 sensor available from Melexis Technologies NV, the thermal sensor array 102 being operably coupled to a processing resource 104, for example a microcontroller, constituting a signal processing circuit. The processing resource 104 is operably coupled to a digital memory 106 and an input/output (I/O) interface 108. The I/O interface 108 can be operably coupled to a display (not shown) for providing a visual representation of the measurements made by the thermal sensor array 102 and an input device (not shown) for receiving control information, for example setting parameters, and triggering measurement. In this example, the thermal sensor array 102 comprises an array of M pixels 110, for example an array of 32×24 pixels, the array of sensors 102 being operably coupled to an array of M amplifiers 112. The array of M amplifiers 112 is operably coupled to an array of M Analogue-to-Digital Converters (ADCs) 114, the array of M ADCs 114 being operably coupled to an Inter-Integrated Circuit ($I^2C$) unit 116 in order to support communications between the thermal sensor array 102 and the processing resource 104. A serial data port 118 of the $I^2C$ unit 116 is therefore operably coupled to the processing resource 104 via a serial data line 120. The $I^2C$ unit 116 also has a clock input 122 for receiving a clock signal in common with the processing resource 104 for communications purposes. The $I^2C$ unit 116 is also operably coupled to a volatile memory, for example a Random Access Memory (RAM) 124 and a non-volatile memory, for example an Electronically Erasable Programmable Read Only Memory (EEPROM) 126.

Figure 2:
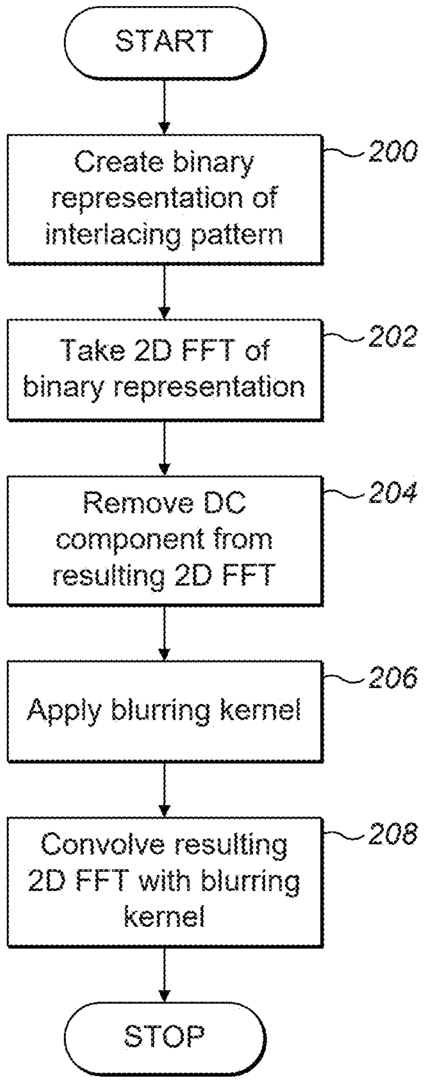
FIG. 2 is a flow diagram of a method of generating a de-interlacing filter constituting another embodiment of the invention.

Referring to FIG. 2, the array of M pixels 110 of the thermal sensor array 102 of FIG. 1 comprises a first set of pixels and a second set of pixels that respectively share the array of M amplifiers 112 and the array of M ADCs 114 in accordance with a first interlacing scan sequence. The first interlacing scan sequence has a first interlacing pixel pattern 300 (FIG. 3(*a*)) associated therewith, the first interlacing scan sequence employing a first interlacing subframe and a second interlacing subframe within a measurement subframe. In order to compensate for possible movement of an object in the field of view of the thermal sensor array 102, it is necessary to generate a de-interlacing filter to be applied to images captured by the thermal sensor array 102. The de-interlacing filter can be generated on-the-fly or can be pre-generated and stored in the digital memory 106 for repeated use.

In order to generate the de-interlacing filter, the processing resource 104 analyses the first interlacing pixel pattern 300 in order to generate (Step 200) a digital representation of the first interlacing pixel pattern 300, for example using a binary representation for each pixel according to the interlacing subframe to which the pixel relates. As the first interlacing scan sequence employs two subframes, two distinct values are used to designate spatially the subframes to which each pixel relates, the positional information associated with each pixel and subframe being recorded in an array data structure, for example. The digital representation of the first interlacing pixel pattern 300 constitutes a map of the pixel array distinguishing pixels assigned to different subframes and hence designates a subframe of the interlacing pixel scan sequence to which each pixel of the array of M pixels 110 relates. More generally, the interlacing pixel pattern comprises a first plurality of pixels and a second plurality of pixels configured to be read during a first measurement subframe and a second measurement subframe of a plurality of measurement subframes, respectively, each of the first and second measurement subframes corresponding to a different period of time within a measurement time frame. In this example, the first and second measurement subframes alternate over a plurality of measurement frames. Following the analysis, an n-state representation of the interlacing pixel pattern is generated and distinguishes between the first plurality of pixels and the second plurality of pixels, where n is the number of measurement subframes. Thus, is the present example, n=2, and two distinct values are employed to distinguish between pixels relating to the first measurement subframe and the second measurement subframe. It should nevertheless be understood that the manner in which the two (or more) measurement subframes is represented can vary depending upon implementation preferences, for example n-bit binary numbers can be employed to represent respectively each measurement subframe.

Figure 3A:
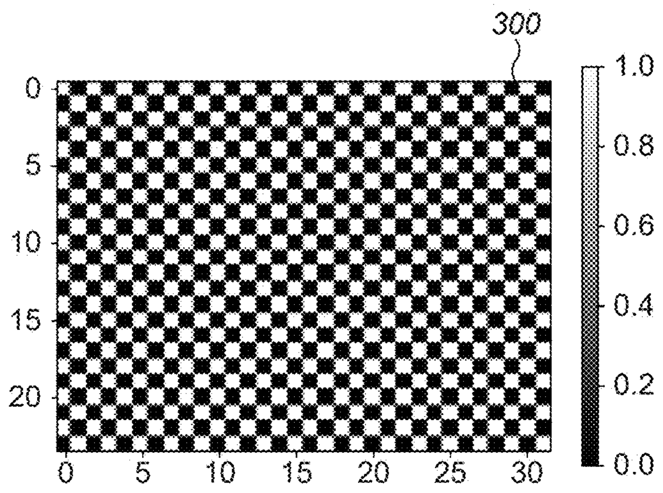
FIGS. 3(*a*) to (*c*) are schematic illustrations of generating the de-interlacing filter from a first interlacing pattern using the method of FIG. 2.
Figure 3B:
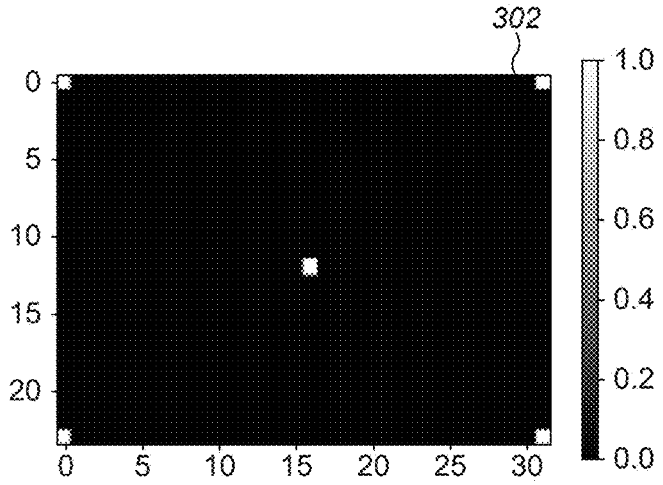
Figure 3C:
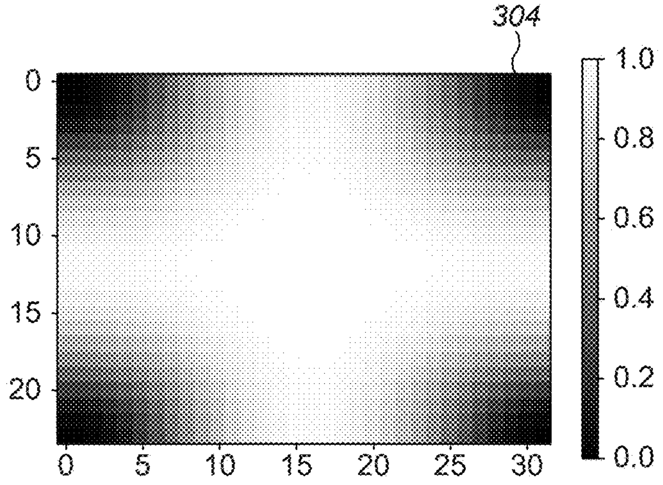

Once the n-state representation of the first interlacing pixel pattern 300 has been generated, the processing resource 104 generates (Step 202) a two-dimensional Fast Fourier Transform (FFT) of the digital representation of the first interlacing pixel pattern 300 to yield a first 2D FFT representation 302 (FIG. 3(*b*)) constituting a spatial frequency domain representation of the n-state representation of the first interlacing pixel pattern 300.

The spatial frequency of images is defined as the number of lines per millimeter. Thus, abrupt changes in temperature between two neighboring pixels, for example as caused by a moving object in the field of view of the thermal sensor array 102, leads to high frequency components in the spatial frequency domain. When using the first interlacing scan sequence, which employs a chequerboard interlacing pattern, the highest frequencies associated with the motion artefacts are located in the corners of the first 2D FFT binary representation 302. The first 2D FFT binary representation 302 also comprises a DC component, but the de-interlacing filter only has to remove the high frequency components and so it is necessary to remove (Step 204) the DC component from the first 2D FFT binary representation 302 when generating the de-interlacing filter, the DC component being located in the centre of the first 2D FFT binary representation 302. Following removal of the DC component, a first DC-less 2D FFT binary representation results, constituting a DC-less spatial frequency domain representation.

Typically, images comprising motion artifacts have multiple frequencies spread around the interlace frequency components. Therefore, a kernel filter configured to blur can be selected and applied, by convolution, to the first DC-less 2D FFT binary representation in order to include those frequencies in the interlacing filter that is being generated. In this example, the blurring kernel is a Gaussian kernel, but other suitable kernels can be employed depending upon the distribution of the high-frequency components in the first 2D FFT binary representation 302. In this example, the Gaussian kernel is particularly suited owing to frequencies of the first 2D FFT binary representation 302 being evenly distributed in x and y directions. However, other blur filters can be employed, for example a box blur filter.

The processing resource 104 therefore applies (Step 206) the Gaussian blurring kernel by convolution to the first DC-less 2D FFT binary representation to yield the de-interlacing filter 304 (FIG. 3(*c*)). As processing is in the frequency domain, the convolution is achieved by generating an FFT of the kernel filter and multiplying the FFT of the kernel filter with the first DC-less 2D FFT binary representation.

Figure 4A:
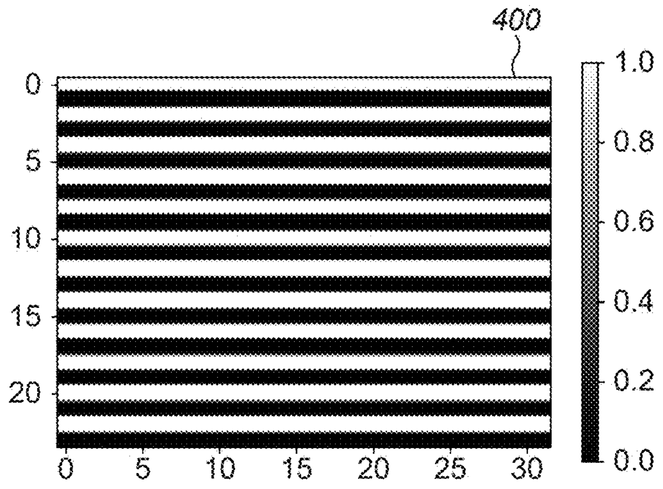
FIGS. 4(*a*) to (*c*) are schematic illustrations of generating the de-interlacing filter from a second interlacing pattern using the method of FIG. 2.
Figure 4B:
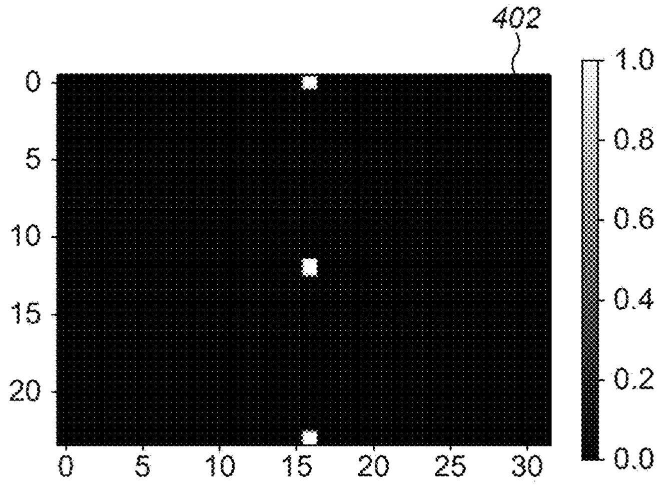
Figure 4C:
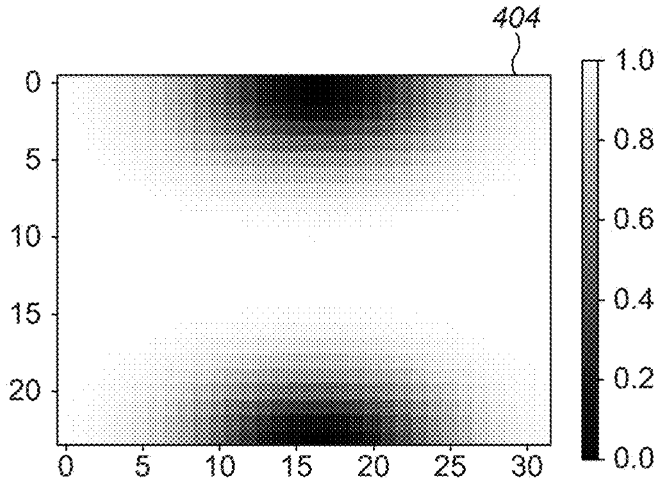

Turning to FIGS. 4(*a*) to 4(*c*), in another embodiment a second interlacing scan sequence is employed instead of the first interlacing scan sequence. The second interlacing scan sequence employs a second interlacing pixel pattern 400 (FIG. 4(*a*)), which the processing resource 104 analyses in order to generate (Step 200) a digital representation of the second interlacing pixel pattern 400, for example using a binary representation for each pixel according to the interlacing subframe to which the pixel relates, as in the example of the first interlacing pixel pattern 300 described above.

Once the digital representation of the second interlacing pixel pattern 400 has been generated, the processing resource 104 generates (Step 202) a two-dimensional Fast Fourier Transform (FFT) of the digital representation of the second interlacing pixel pattern 400 to yield a second 2D FFT binary representation 402 (FIG. 4(*b*)).

When using the second interlacing scan sequence, which employs an alternating horizontal line pattern constituting an example of an interleaved pattern, the highest frequencies associated with the motion artefacts are now located centrally in the upper and lower regions of the second 2D FFT binary representation 402. The second 2D FFT binary representation 402 again also comprises a DC component, but the de-interlacing filter only has to remove the high frequency components and so it is necessary to remove (Step 204) the DC component from the second 2D FFT binary representation 402 when generating the de-interlacing filter, the DC component being again located in the centre of the second 2D FFT binary representation 402. Following removal of the DC component, a second DC-less 2D FFT binary representation results.

A blurring kernel can again be applied, by convolution, to the second DC-less 2D FFT binary representation in order to include, in the interlacing filter that is being generated, frequencies around the locations of the high frequencies in the second DC-less 2D FFT binary representation. In this example, the blurring kernel is a Gaussian kernel, but other suitable kernels can be employed depending upon the distribution of the high-frequency components in the second 2D FFT binary representation 402.

The processing resource 104 therefore applies (Step 206) the Gaussian blurring kernel to the second DC-less 2D FFT binary representation to yield the second de-interlacing filter 404 (FIG. 4(*c*)).

Figure 5:
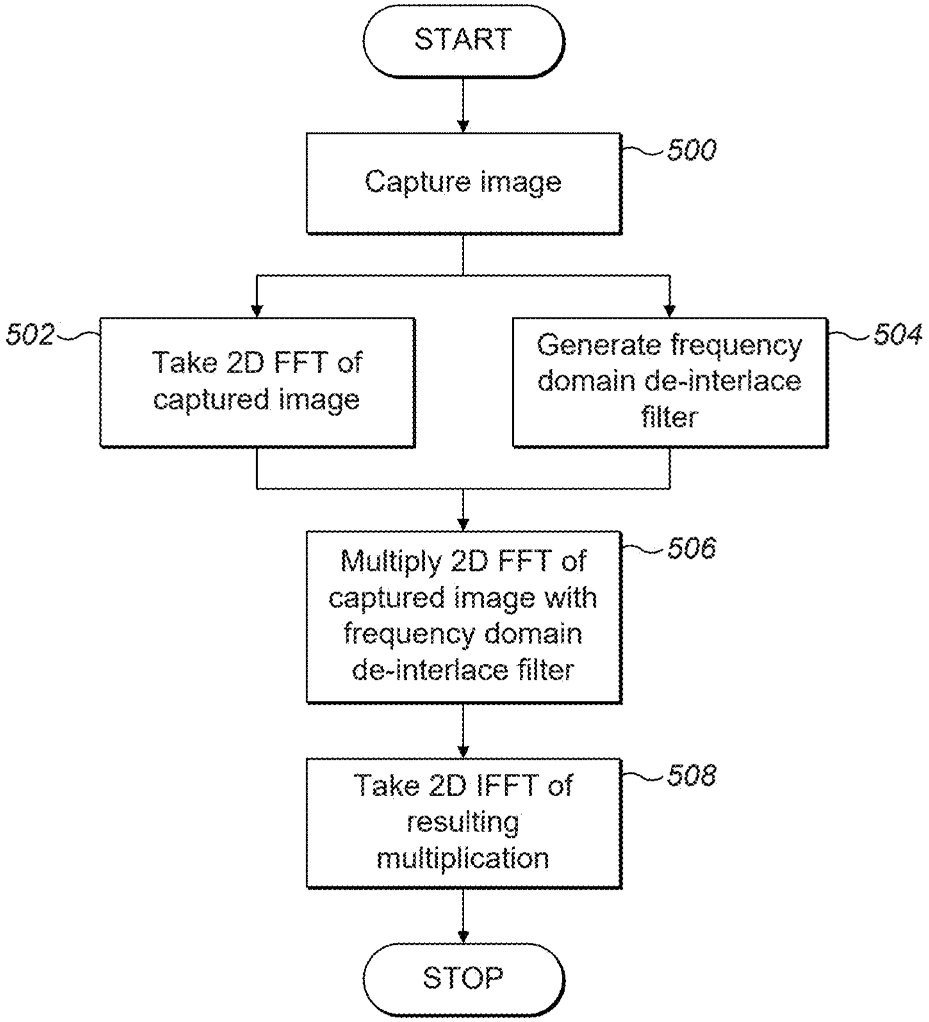
FIG. 5 is a flow diagram of a method of de-interlacing an image using the de-interlacing filter generated using the method of FIG. 2, and constituting a further embodiment of the invention.
Figure 6A:
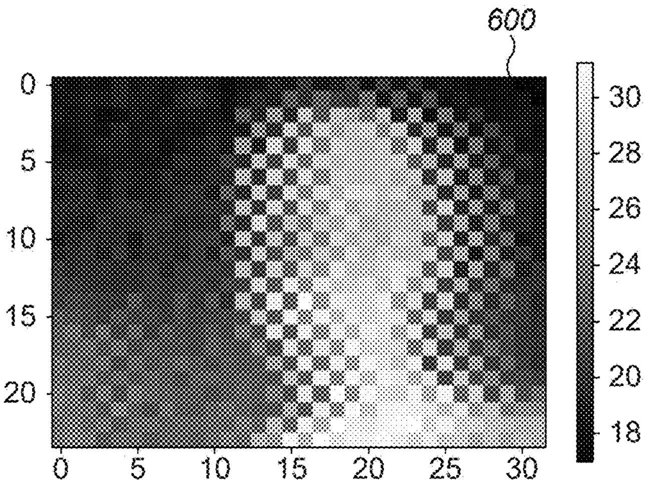
FIGS. 6(*a*) to (*e*) are schematic illustrations of images associated with de-interlacing a first image captured using the first de-interlacing pattern using the method of FIG. 5.
Figure 6B:
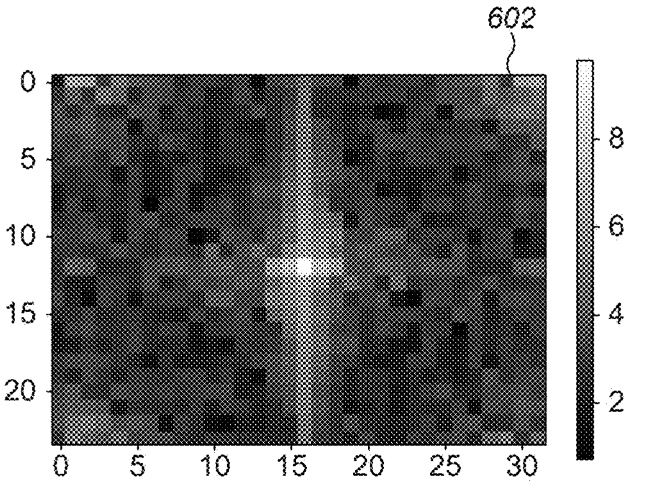
Figure 6C:
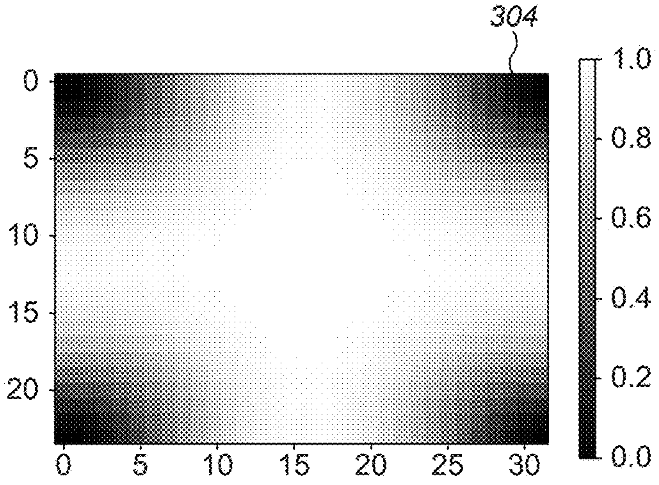
Figure 6D:
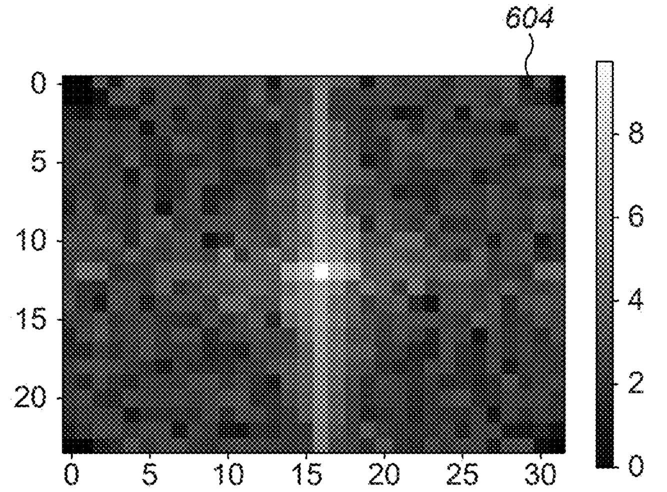
Figure 6E:
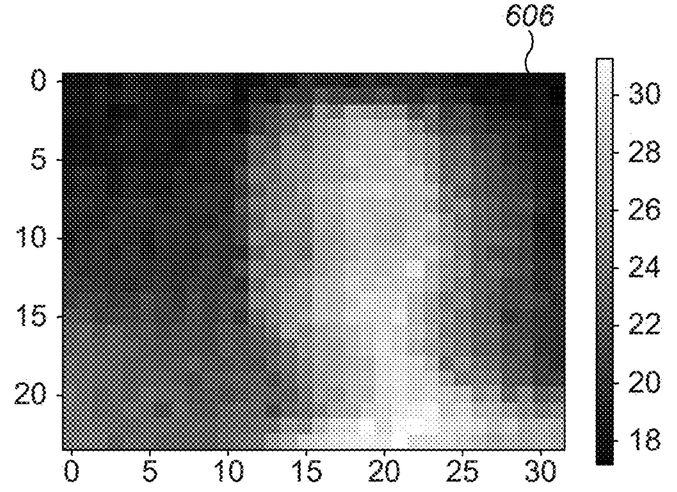
Figure 7A:
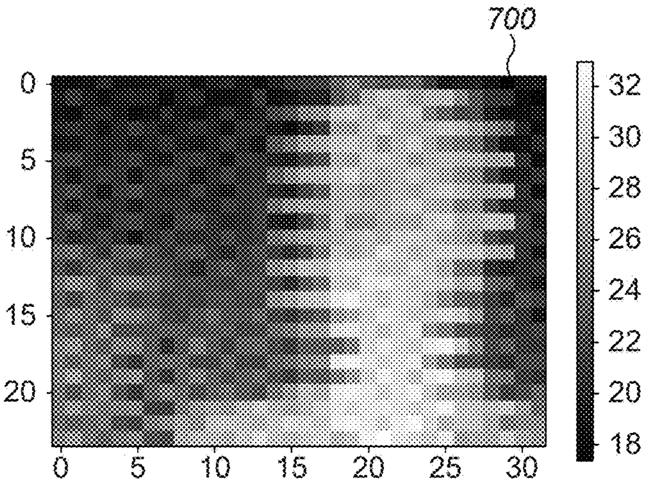
FIGS. 7(*a*) to (*e*) are schematic illustrations of images associated with de-interlacing a second image captured using the second de-interlacing pattern using the method of FIG. 5.
Figure 7B:
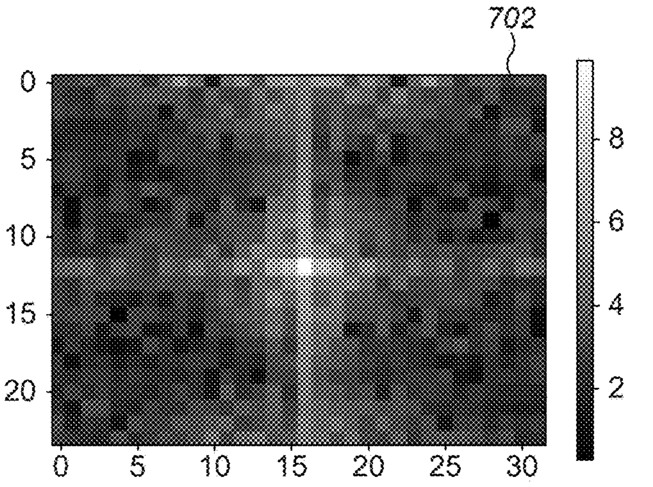
Figure 7C:
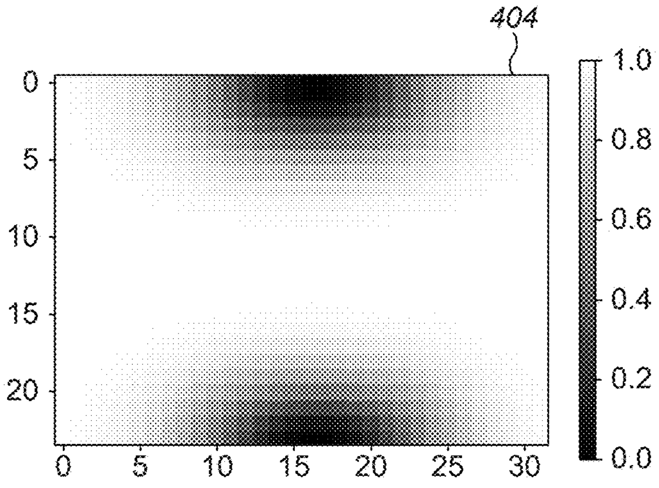
Figure 7D:
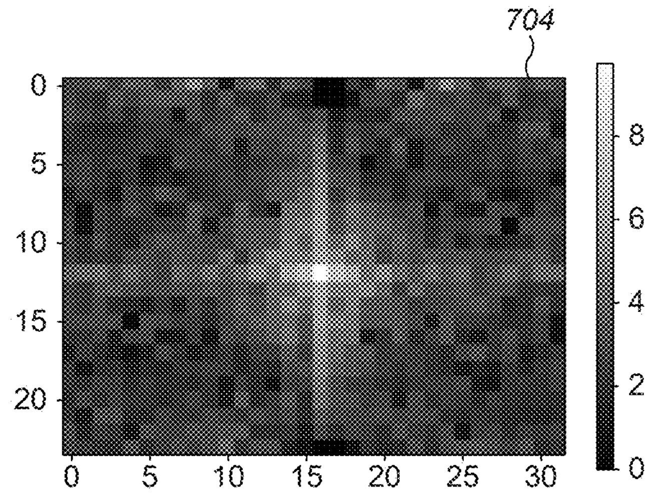
Figure 7E:
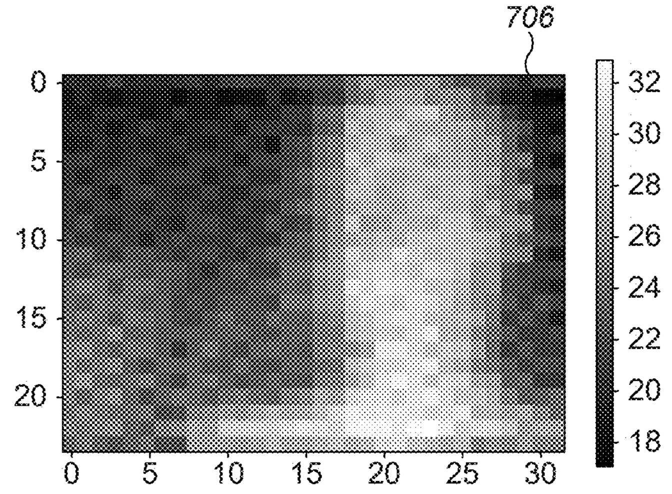
Figure 8A:
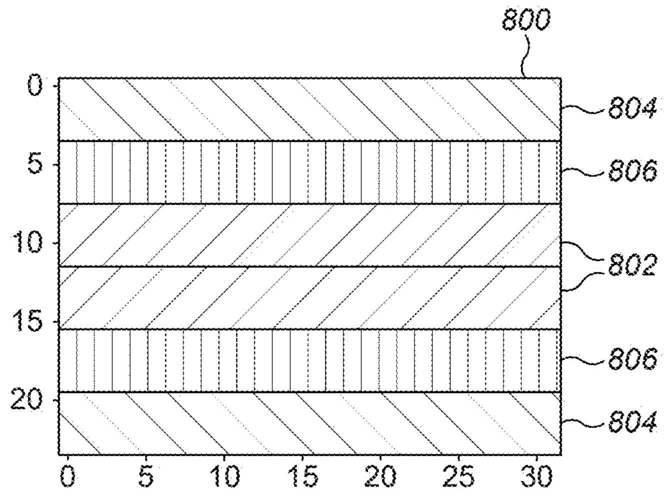
FIGS. 8(*a*) to (*d*) are illustrations of generating the de-interlacing filter from a third interlacing pattern using the method of FIG. 2.
Figure 8B:
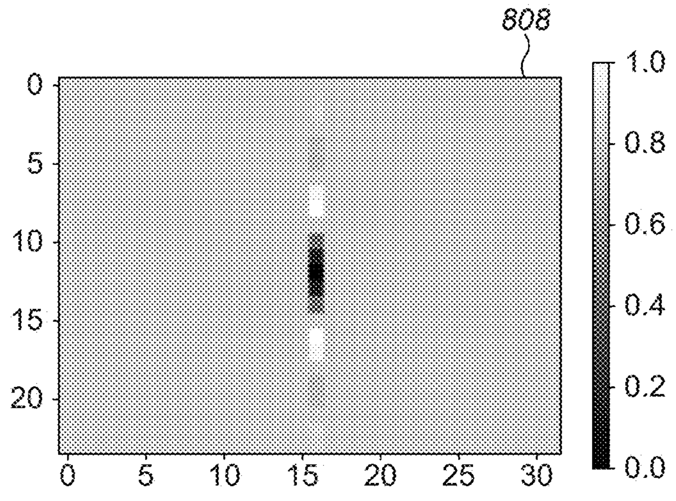
Figure 8C:
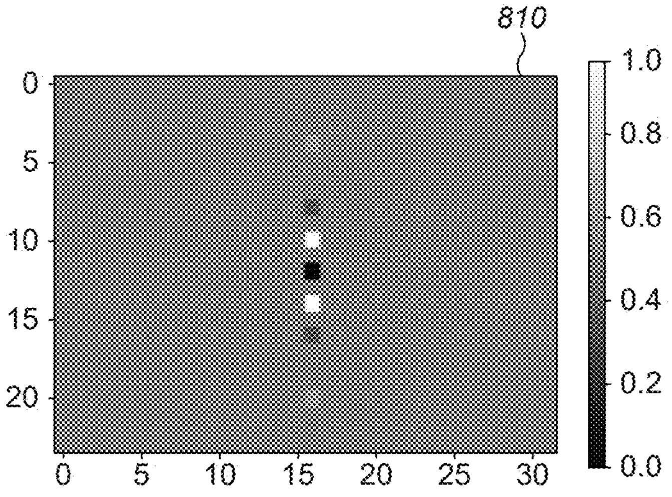
Figure 8D:
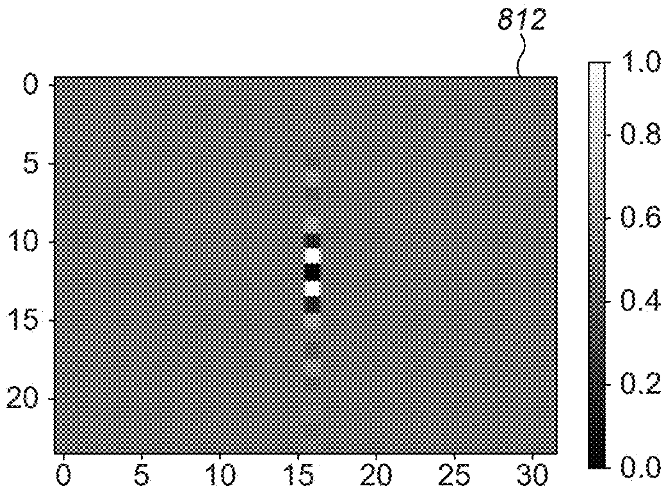

Referring to FIG. 5, an image captured by the temperature imaging system 100 is de-interlaced as follows. Electromagnetic radiation emitted by an object is received by the array of M pixels 110 and electrical signals are generated in response to the received electromagnetic radiation and measured by the thermal sensor array 102. The temperature imaging system 100 thus initially captures (Step 500) a first image 600 (FIG. 6(*a*)). Thereafter, the processing resource 104 generates (Step 502) a first 2D FFT of the captured image 602 (FIG. 6(*b*)), thereby translating the first image 600 to the spatial frequency domain, as well as generating (Step 504) the first de-interlacing filter 304 (FIG. 6(*c*)). The first de-interlacing filter 304 is in the spatial frequency domain, as of course is the first 2D FFT of the captured image 602. The first 2D FFT of the captured image 602 is then convolved with the first de-interlacing filter 304, but as both are in the spatial frequency domain, the convolution is achieved by simple multiplication (Step 506) of the first 2D FFT of the captured image 602 with the first de-interlacing filter 304 to yield a first frequency domain filtered image 604 (FIG. 6(*d*)) in the spatial frequency domain.

Following convolution of the 2D FFT of the captured image 602 with the first de-interlacing filter 304, the first frequency domain filtered image 604 is converted back to the spatial domain by performing an inverse FFT on the first frequency domain filtered image 604 to yield a first de-interlaced image 606 (FIG. 6(*e*)).

In another embodiment, employing the second interlacing scan sequence, an image is again captured by the temperature imaging system 100 and de-interlaced as follows. The temperature imaging system 100 initially captures (Step 500) a second image 700 (FIG. 7(*a*)). Thereafter, the processing resource 104 generates (Step 502) a second 2D FFT of the captured image 702 (FIG. 7(*b*)) as well as generating (Step 504) the second de-interlacing filter 404 (FIG. 7(*c*)). The second de-interlacing filter 404 is in the spatial frequency domain, as of course is the second 2D FFT of the captured image 702. The second 2D FFT of the captured image 702 is then convolved with the second de-interlacing filter 404, but as both are in the spatial frequency domain, the convolution is achieved by simple multiplication (Step 506) of the second 2D FFT of the captured image 702 with the second de-interlacing filter 404 to yield a second frequency domain filtered image 704 (FIG. 7(*d*)).

Following convolution of the second 2D FFT of the captured image 702 with the second de-interlacing filter 404, the second frequency domain filtered image 704 is converted back to the spatial domain by performing an inverse FFT on the second frequency domain filtered image 704 to yield a second de-interlaced image 706 (FIG. 6(*c*)).

The skilled person should appreciate that the above-described implementations are merely examples of the various implementations that are conceivable within the scope of the appended claims. Indeed, it should be appreciated that although the chequerboard and alternating horizontal line interlacing scan sequences have been described above, other interlacing scan sequences can be employed, employing the same number of subframes or a greater number of subframes. The distribution of the subframe pixels can vary too. For example, and referring to FIGS. 8(*a*) to 8(*d*), a three subframe interlacing scan sequence, employing a third interlacing pattern 800 of horizontal bands of pixels, can be employed. The third interlacing pattern 800 comprises a first plurality of pixels arranged as a central band of pixels 802 assigned to a first subframe, a second plurality of pixels arranged as two outer bands of pixels 804 assigned to a second subframe and a third plurality of pixels arranged as a third pair of bands 806 of pixels sandwiched between the central band of pixels 802 and the two outer bands of pixels 804, respectively. In such an example, the n-state representation, where n=3, of this interlacing pattern distinguishes between the first, second and third plurality of pixels. A 2D FFT of the first subframe 808 (FIG. 8(*b*)), a 2D FFT of the second subframe 810 (FIG. 8(*c*)), and a 2D FFT of the third subframe 812 (FIG. 8(*d*)) show that the respective interlacing frequencies of the three subframe scan sequence are closer to the DC component and are thus more challenging to filter. When employing such a scan sequence, measurement results of a most recently measured subframe can replace a previously filtered image and the replacement image can be filtered with the corresponding de-interlace filter. In this regard, each measured subframe is filtered using a respective associated de-interlace filter, for example subframe #1 is filtered using de-interlace filter #1, subframe #2 is filtered using de-interlace filter #2, and subframe #3 is filtered using de-interlace filter #3.

Although the above examples discuss the generation and application of a de-interlacing filter in relation to thermal images captured, the skilled person should appreciate that the principles of the above examples apply to other images captured where interlacing is employed to capture images in relation to any wavelength or wavelengths of electromagnetic radiation.

What is claimed is:

1. A method of generating a de-interlacing filter, the method comprising:

analyzing a pixel array comprising a pixel interlacing pattern, the pixel interlacing pattern identifying a first plurality of pixels and a second plurality of pixels to be read during a first measurement subframe of a plurality of measurement subframes and a second measurement subframe of the plurality of measurement subframes of an interlacing pixel scan sequence, respectively;

in response to analyzing the pixel array, generating an n-state representational map of the pixel interlacing pattern distinguishing between the first plurality of pixels and the second plurality of pixels by assigning to each pixel position in respect of the pixel array a value designating a measurement subframe of the interlacing pixel scan sequence, where n is a number of measurement subframes;

translating the n-state representational map of the pixel interlacing pattern to a spatial frequency domain, thereby generating a spatial frequency domain representation of the n-state representational map of the pixel interlacing pattern;

removing a DC signal component from the spatial frequency domain representation of the n-state representational map of the pixel interlacing pattern, thereby generating a DC-less spatial frequency domain representation;

selecting a kernel filter configured to blur; and convolving the DC-less spatial frequency domain representation with the selected kernel filter.

2. The method according to claim 1, wherein the kernel filter is a Gaussian blur filter or a box blur filter.

3. The method according to claim 1, wherein the pixel interlacing pattern is a chequerboard pattern.

4. The method according to claim 1, wherein the pixel interlacing pattern is an interleaved pattern.

5. The method according to claim 4, wherein the interleaved pattern comprises a series of alternating horizontal lines of pixels.

6. The method according to claim 1, wherein the pixel interlacing pattern comprises a third plurality of pixels to be read in respect of a third measurement subframe, the n-state representational map of the pixel interlacing pattern distinguishing between the first plurality of pixels, the second plurality of pixels, and the third plurality of pixels.

7. The method according to claim 1, wherein translating the n-state representational map of the pixel interlacing pattern to the spatial frequency domain comprises:

calculating a two-dimensional Fourier transform in respect of the n-state representational map of the pixel interlacing pattern.

8. The method according to claim 1, wherein generating the n-state representational map of the pixel interlacing pattern comprises:

generating a measurement subframe map of the pixel array, the measurement subframe map being an array representing each pixel of the pixel array; and for each element of the measurement subframe map, recording the measurement subframe assigned to a corresponding pixel of the pixel array.

9. The method according to claim 1, wherein the plurality of measurement subframes is two measurement subframes.

10. The method according to claim 1, wherein the plurality of measurement subframes is three measurement subframes.

11. A method of de-interlacing an image, the method comprising:

capturing an image;

translating the image to the spatial frequency domain;

generating a de-interlacing filter according to claim 1; and applying the de-interlacing filter to the spatial frequency domain representation of the image captured.

12. The method according to claim 11, wherein the de-interlacing filter is applied by multiplying the de-interlacing filter with the spatial frequency domain representation of the image captured, thereby generating a de-interlaced image in the spatial frequency domain.

13. The method according to claim 12, further comprising:

translating the de-interlaced image in the spatial frequency domain to a spatial domain.

14. The method according to claim 11, wherein the image captured is a thermal image.

15. An image processing apparatus comprising:

a pixel array configured to receive electromagnetic radiation and measure electrical signals generated by each pixel of the pixel array in response to receipt of the electromagnetic radiation, the pixel array comprising a pixel interlacing pattern, the pixel interlacing pattern identifying a first plurality of pixels and a second plurality of pixels to be read during a first measurement subframe of a plurality of measurement subframes and a second measurement subframe of the plurality of measurement subframes of an interlacing pixel scan sequence, respectively; and a signal processing circuit configured to analyse the pixel array and in response to analyzing the pixel array to generate an n-state representational map of the pixel interlacing pattern distinguishing between the first plurality of pixels and the second plurality of pixels by assigning to each pixel position in respect of the pixel array a value designating a measurement subframe of the interlacing pixel scan sequence, where n is a number of measurement subframes; wherein the signal processing circuit is configured to translate the n-state representational map of the pixel interlacing pattern to a spatial frequency domain, thereby generating a spatial frequency domain representation of the n-state representational map of the pixel interlacing pattern;

the signal processing circuit is configured to remove a DC signal component from the spatial frequency domain representation of the n-state representational map of the pixel interlacing pattern, thereby generating a DC-less spatial frequency domain representation;

the signal processing circuit is configured to select a kernel filter configured to blur; and the signal processing circuit is configured to convolve the DC-less spatial frequency domain representation with the selected kernel filter.

* * * * *